(12) United States Patent
Ryu et al.

(10) Patent No.: US 7,678,212 B2
(45) Date of Patent: Mar. 16, 2010

(54) LIQUID CRYSTAL DISPENSING SYSTEM WHICH CAN READ INFORMATION OF LIQUID CRYSTAL CONTAINER AND METHOD OF DISPENSING LIQUID CRYSTAL MATERIAL USING SAME

(75) Inventors: Joung-Ho Ryu, Seoul (KR); Soo-Min Kwak, Gyeongsangbuk-Do (KR); Hae-Joon Son, Busan (KR)

(73) Assignee: LG Display Co., Ltd., Seoul (KR)

( * ) Notice: Subject to any disclaimer, the term of this patent is extended or adjusted under 35 U.S.C. 154(b) by 1134 days.

(21) Appl. No.: 11/294,527

(22) Filed: Dec. 6, 2005

(65) Prior Publication Data

US 2006/0083849 A1    Apr. 20, 2006

Related U.S. Application Data

(62) Division of application No. 10/874,169, filed on Jun. 24, 2004, now Pat. No. 7,384,485.

(30) Foreign Application Priority Data

Jun. 24, 2003    (KR)    ............... 10-2003-0041277

(51) Int. Cl.
    *B32B 11/10*    (2006.01)
(52) U.S. Cl. .................... 156/64; 427/427.2
(58) Field of Classification Search ............ 156/64; 427/427.2; 700/240, 242, 244
    See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe |
| 5,539,545 A | 7/1996 | Shimizu et al. |
| 5,548,429 A | 8/1996 | Tsujita |
| 5,642,214 A | 6/1997 | Ishii et al. |
| 5,680,189 A | 10/1997 | Shimizu et al. |
| 5,742,370 A | 4/1998 | Kim et al. |

(Continued)

FOREIGN PATENT DOCUMENTS

EP    1 003 066    5/2000

(Continued)

*Primary Examiner*—George R Koch, III
(74) *Attorney, Agent, or Firm*—McKenna Long & Aldridge

(57) ABSTRACT

A liquid crystal dispensing system includes a liquid crystal material container to contain liquid crystal, the liquid crystal material container provided with a first code corresponding to liquid crystal information; a reading unit to read the recognition code; a discharge pump to draw in and discharge liquid crystal from the liquid crystal material container; and a nozzle to dispense liquid crystal from the discharge pump onto a substrate.

12 Claims, 13 Drawing Sheets

U.S. PATENT DOCUMENTS

| | | | |
|---|---|---|---|
| 5,757,451 | A | 5/1998 | Miyazaki et al. |
| 5,852,484 | A | 12/1998 | Inoue et al. |
| 5,854,664 | A | 12/1998 | Inoue et al. |
| 5,861,932 | A | 1/1999 | Inata et al. |
| 5,875,922 | A | 3/1999 | Chastine et al. |
| 5,952,676 | A | 9/1999 | Sato et al. |
| 5,956,112 | A | 9/1999 | Fujimori et al. |
| 6,001,203 | A | 12/1999 | Yamada et al. |
| 6,011,609 | A | 1/2000 | Kato et al. |
| 6,016,178 | A | 1/2000 | Kataoka et al. |
| 6,016,181 | A | 1/2000 | Shimada |
| 6,055,035 | A | 4/2000 | von Gutfeld et al. |
| 6,163,357 | A | 12/2000 | Nakamura |
| 6,190,739 | B1 * | 2/2001 | Hoffer et al. ............... 427/424 |
| 6,219,126 | B1 | 4/2001 | Von Gutfeld |
| 6,226,067 | B1 | 5/2001 | Nishiguchi et al. |
| 6,236,445 | B1 | 5/2001 | Foschaar et al. |
| 6,296,708 | B1 * | 10/2001 | Coulibaly et al. ........... 118/679 |
| 6,304,306 | B1 | 10/2001 | Shiomi et al. |
| 6,304,311 | B1 | 10/2001 | Egami et al. |
| 6,337,730 | B1 | 1/2002 | Ozaki et al. |
| 6,414,733 | B1 | 7/2002 | Ishikawa et al. |
| 6,558,127 | B2 * | 5/2003 | Maruyama et al. .......... 417/44.1 |
| 6,926,929 | B2 * | 8/2005 | Watts et al. ............... 427/256 |
| 2001/0021000 | A1 | 9/2001 | Egami |
| 2002/0062787 | A1 * | 5/2002 | Hashizume et al. ......... 118/664 |

FOREIGN PATENT DOCUMENTS

| | | |
|---|---|---|
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 5-127179 | 5/1993 |
| JP | 5-154923 | 6/1993 |
| JP | 5-265011 | 10/1993 |
| JP | 5-281557 | 10/1993 |
| JP | 5-281562 | 10/1993 |
| JP | 6-51256 | 2/1994 |
| JP | 6-148657 | 5/1994 |
| JP | 6-160871 | 6/1994 |
| JP | 6-235925 | 8/1994 |
| JP | 6-265915 | 9/1994 |
| JP | 6-313870 | 11/1994 |
| JP | 7-84268 | 3/1995 |
| JP | 7-128674 | 5/1995 |
| JP | 7-181507 | 7/1995 |
| JP | 8-95066 | 4/1996 |
| JP | 8-101395 | 4/1996 |
| JP | 8-106101 | 4/1996 |
| JP | 8-171094 | 7/1996 |
| JP | 8-190099 | 7/1996 |
| JP | 8-240807 | 9/1996 |
| JP | 9-5762 | 1/1997 |
| JP | 9-26578 | 1/1997 |
| JP | 9-61829 | 3/1997 |
| JP | 9-73075 | 3/1997 |
| JP | 9-73096 | 3/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |
| JP | 2001-183683 | 7/2001 |
| JP | 2001-201750 | 7/2001 |
| JP | 2001-209052 | 8/2001 |
| JP | 2001-209060 | 8/2001 |
| JP | 2001-215459 | 8/2001 |
| JP | 2001-222017 | 8/2001 |
| JP | 2001-235758 | 8/2001 |
| JP | 2001-255542 | 9/2001 |
| JP | 2001-264782 | 9/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001-330840 | 11/2001 |
| JP | 2001-356353 | 12/2001 |
| JP | 2001-356354 | 12/2001 |

| | | | | | | |
|---|---|---|---|---|---|---|
| JP | 2002-14360 | 1/2002 | | JP | 2002-122873 | 4/2002 |
| JP | 2002-23176 | 1/2002 | | JP | 2002-139734 | 5/2002 |
| JP | 2002-49045 | 2/2002 | | JP | 2002-202512 | 7/2002 |
| JP | 2002-82340 | 3/2002 | | JP | 2002-202514 | 7/2002 |
| JP | 2002-90759 | 3/2002 | | JP | 2002-214626 | 7/2002 |
| JP | 2002-90760 | 3/2002 | | KR | 2000-0035302 | 6/2000 |
| JP | 2002-107740 | 4/2002 | | | | |
| JP | 2002-122872 | 4/2002 | | | | |

* cited by examiner

LIQUID CRYSTAL DISPENSING SYSTEM WHICH CAN READ INFORMATION OF LIQUID CRYSTAL CONTAINER AND METHOD OF DISPENSING LIQUID CRYSTAL MATERIAL USING SAME

This application is a divisional of prior application Ser. No. 10/874,169, filed Jun. 24, 2004 now U.S. Pat. No. 7,384,485.

The present application claims the benefit of Korean Patent Application No. 2003-41277 filed in Korea on Jun. 24, 2003. The present application further incorporates by reference U.S. patent application Ser. No. 10/421,714, which has published as U.S. Patent Publication No. 2004-0011422-A1.

BACKGROUND OF THE INVENTION

1. Field of the Invention

The present invention relates to a liquid crystal display device manufacturing equipment, and more particularly, to a liquid crystal dispensing system.

2. Description of the Related Art

Recently, various portable electric devices, such as mobile phones, personal digital assistants (PDAs), and notebook computers, have been developed because of their small size, light weight, and power-efficient operations. Accordingly, flat panel display devices, such as liquid crystal displays (LCDs), plasma display panels (PDPs), field emission displays (FEDs), and vacuum fluorescent displays (VFDs), have been developed. Of these flat panel display devices, the LCDs are currently mass produced because of their simple driving scheme and superior image quality.

FIG. 1 is a cross sectional view of an LCD device according to the related art. In FIG. 1, an LCD device 1 comprises a lower substrate 5, an upper substrate 3, and a liquid crystal layer 7 formed therebetween. The lower substrate 5 is a driving device array substrate, and includes a plurality of pixels (not shown) and a driving device, such as a thin film transistor (TFT), formed on each pixel. The upper substrate 3 is a color filter substrate, and includes a color filter layer for reproducing real color. In addition, a pixel electrode and a common electrode are formed on the lower substrate 5 and the upper substrate 3, respectively. An alignment layer is formed on both the lower and upper substrates 5 and 3 to align liquid crystal molecules of the liquid crystal layer 7. The lower substrate 5 and the upper substrate 3 are attached along a perimeter by a sealant 9, and the liquid crystal 7 is confined within the perimeter. In operation, the liquid crystal molecules of the liquid crystal layer 7 are reoriented by the driving device formed on the lower substrate 5 to control amounts of light transmitted through the liquid crystal layer 7, thereby displaying an image.

FIG. 2 is a flow chart of a fabrication method for an LCD device according to the related art. In FIG. 2, a fabrication method includes three sub-processes for manufacturing an LCD device: a driving device array substrate process for forming the driving device on the lower substrate 5; a color filter substrate process for forming the color filter on the upper substrate 3; and a cell process.

In Step S101, a plurality of gate lines and data lines are formed on the lower substrate 5 to define a pixel area by the driving device array process, and the thin film transistor connected to both the gate line and the data line is formed on the each pixel area. In addition, a pixel electrode, which is to be connected to the thin film transistor to drive the liquid crystal layer according to a signal applied through the thin film transistor, is formed by the driving device array process. In Step S104, R, G, and B color filter layers for reproducing the color and a common electrode are formed on the upper substrate 3 by the color filter process.

In Steps S102 and S105, alignment layers are formed on the lower substrate 5 and the upper substrate 3. Then, the alignment layers are individually rubbed to induce surface anchoring (i.e. a pretilt angle and an alignment direction) for the liquid crystal molecules of the liquid crystal layer 7. In Step S103, a spacer is dispersed onto the lower substrate 5 for maintaining a uniform cell gap between the lower and upper substrates 5 and 3. In Step S106, a sealant is printed along outer portions of the upper substrate 3.

In Step S107, the lower and upper substrates 5 and 3 are assembled together by compression. The lower substrate 5 and the upper substrate 3 are both made of glass substrates, and include a plurality of unit panel areas on which the driving device and the color filter layer are formed. In Step S108, the assembled upper and lower glass substrates 5 and 3 are cut into unit panels. In Step S109, liquid crystal material is injected into the gap formed between the upper and lower substrates 5 and 3 of the unit panels through a liquid crystal injection hole. The filled unit panel is completed by sealing the liquid crystal injection hole. In Step S110, the filled and sealed unit panel is tested.

FIG. 3 is a schematic view of a liquid crystal injection system for fabricating an LCD device according to the related art. In FIG. 3, a container 12 in which liquid crystal material 14 is contained is placed in a vacuum chamber 10, and the liquid crystal display panel 1 is located at an upper side of the container 12. Then, the vacuum chamber 10 is connected to a vacuum pump (not shown) to maintain a predetermined vacuum/pressure state within the vacuum chamber 10. In addition, a liquid crystal display panel moving device (not shown) is installed in the vacuum chamber 10 to move the liquid crystal display panel 1 from the upper side of the container 12 to a surface of the liquid crystal material 14, thereby contacting an injection hole 16 of the liquid crystal display panel 1 to the liquid crystal material 14. Accordingly, this method is commonly called as a liquid crystal dipping injection method.

When the vacuum/pressure level within the chamber 10 is decreased by an inflow of nitrogen gas ($N_2$) into the vacuum chamber 10 in the state that the injection hole 16 of the liquid crystal display panel 1 contacts the surface of the liquid crystal material 14, the liquid crystal material 14 is injected into the liquid crystal display panel 1 through the injection hole 16 by the pressure differential between the vacuum/pressure level within the liquid crystal display panel 1 and the pressure/level within the vacuum chamber 10. After the liquid crystal material 14 is completely filled into the liquid crystal display panel 1, the injection hole 16 is sealed by a sealant to seal the liquid crystal material 14 within the liquid crystal display panel 1. Accordingly, this method is called as a vacuum injection method.

However, there are several problems with both the liquid crystal dipping injection method and/or vacuum injection method. First, an overall time for injection of the liquid crystal material 14 into the panel 1 is relatively long for either method. In general, a gap thickness between the driving device array substrate and the color filter substrate in the liquid crystal display panel 1 is relatively narrow, i.e., a few micrometers. Accordingly, a relatively small amount of liquid crystal material 14 is injected into the liquid crystal display panel 1 per unit time. For example, it takes about 8 hours to completely inject the liquid crystal material 14 into a 15-inch liquid crystal display panel, and thus, fabricating efficiency is decreased. Second, consumption of the liquid crystal material 14 during the liquid crystal injection method is large. Only a small amount of the liquid crystal material 14 in the container 12 is actually injected into the liquid crystal display panel 1. Accordingly, during loading of the liquid crystal display panel 1 into the vacuum chamber 10, the unused liquid crystal material 14 is exposed to atmosphere or to certain gases, thereby contaminating the liquid crystal material 14. Thus, any remaining liquid crystal material 14 must be discarded after the injection of the liquid crystal material 14 into a plurality of liquid crystal display panels 1, thereby increasing fabricating costs.

SUMMARY OF THE INVENTION

Accordingly, the present invention is directed to a liquid crystal dispensing system and method of dispensing liquid crystal material using the same that substantially obviates one or more of the problems due to limitations and disadvantages of the related art.

Therefore, an object of the present invention is to provide a liquid crystal dispensing system to directly dispense liquid crystal onto a glass substrate of a large area including at least one liquid crystal panel, and a method of dispensing liquid crystal material using the same.

Another object of the present invention is to provide a liquid crystal dispensing system that prevents inferiorities and defects in liquid crystal display (LCD) devices Another object of the present invention is to provide a liquid crystal dispensing system capable of preventing non-preset liquid crystal from being dispensed onto a substrate by forming a recognition code in which liquid crystal information is recorded at a liquid crystal container, and a method of dispensing liquid crystal using the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal dispensing system comprises a liquid crystal material container to contain liquid crystal, the liquid crystal material container provided with a first code corresponding to liquid crystal information; a reading unit to read the recognition code; a discharge pump to draw in and discharge liquid crystal from the liquid crystal material container; and a nozzle to dispense liquid crystal from the discharge pump onto a substrate.

In another aspect, a liquid crystal dispensing system comprises a liquid crystal material container to contain liquid crystal; a discharge pump including a case, a cylinder, a piston inserted into the cylinder and provided with a groove at a lower portion thereof to draw in and discharge liquid crystal by rotating and moving up-down, and a suction opening and a discharge opening to respectively draw in and discharge liquid crystal as the piston moves; a first motor to drive the discharge pump; a nozzle installed at a lower portion of the discharge pump to dispensing liquid crystal from the discharge pump onto a substrate; and a reading unit to read substrate information recorded in a code formed at the substrate.

In another aspect, a liquid crystal dispensing method comprises loading a substrate on a liquid crystal dispensing system; setting a liquid crystal dispensing condition; reading liquid crystal information; judging whether a liquid crystal dispensing is suitable by comparing the read information with the set condition; and dispensing liquid crystal.

In another aspect, a liquid crystal dispensing method comprises loading a substrate on a liquid crystal dispensing system; setting a liquid crystal dispensing condition crystal by reading a code formed at the substrate; and operating a liquid crystal discharge pump to dispense liquid crystal onto the substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

To solve the problems of the related liquid crystal injection methods such as a liquid crystal dipping method or a liquid crystal vacuum injection method, a liquid crystal dropping method has been recently introduced. The liquid crystal dropping method is a method for forming a liquid crystal layer by directly dropping the liquid crystal onto the substrates and spreading the dropped liquid crystal over the entire panel by pressing together the substrates during the assembling procedure of the substrates rather than by injecting the liquid crystal into the empty unit panel by the pressure difference between the inner and outer sides of the panel. According to the above liquid crystal dropping method, the liquid crystal is directly dropped onto the substrate in a short time period so that the liquid crystal layer in a LCD of larger area can be formed quickly. In addition, the liquid crystal consumption can be minimized due to the direct dropping of the liquid crystal as much as required amount, and therefore, the fabrication cost can be reduced.

Figure 4:
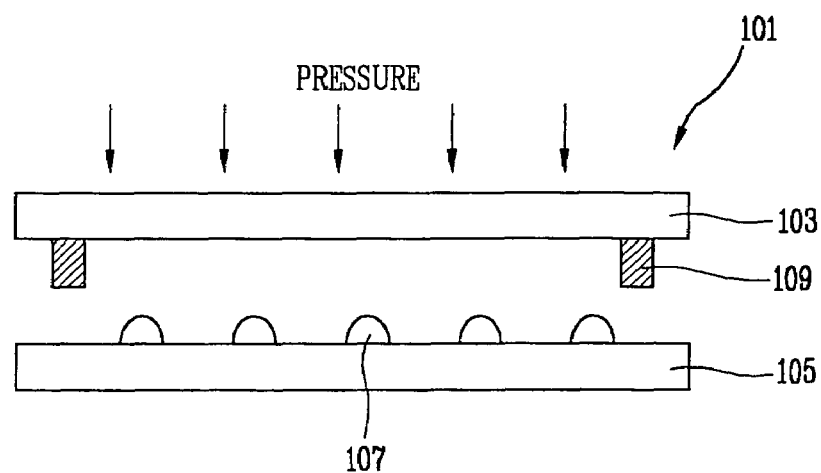
FIG. 4 is a cross sectional view of an LCD device fabricated by a liquid crystal dispensing method according to an embodiment of the present invention.

FIG. 4 is a view illustrating a basic concept of a liquid crystal dispensing method according to an embodiment of the present invention. In FIG. 4, liquid crystal material 107 may be dropped onto a lower substrate 105 having a driving device prior to assembling the lower substrate 105 and an upper substrate 103 having a color filter. Alternatively, the liquid crystal material 107 may be dropped onto the upper substrate 103 upon which the color filter is formed. For example, the liquid crystal material 107 may be formed either on a thin film transistor (TFT) substrate or on a color filter (CF) substrate.

A sealant 109 may be applied along at least an outer perimeter portion of the upper substrate 103. Then, the upper substrate 103 and the lower substrate 105 may be assembled together by pressing the upper and lower substrates 103 and 105 together to form an LCD display panel 101. Accordingly, the drops of the liquid crystal material 107 spread out between the upper and lower substrates 103 and 105 by pressure applied to the upper and/or lower substrates 103 and 105, thereby forming a liquid crystal material layer of uniform thickness between the upper substrate 103 and the lower substrate 105. Thus, in the exemplary LCD device fabrication method, the liquid crystal material 107 may be dropped onto the lower substrate 105 before the upper and lower substrates 103 and 105 are assembled together to form the LCD display panel 101.

Figure 5:
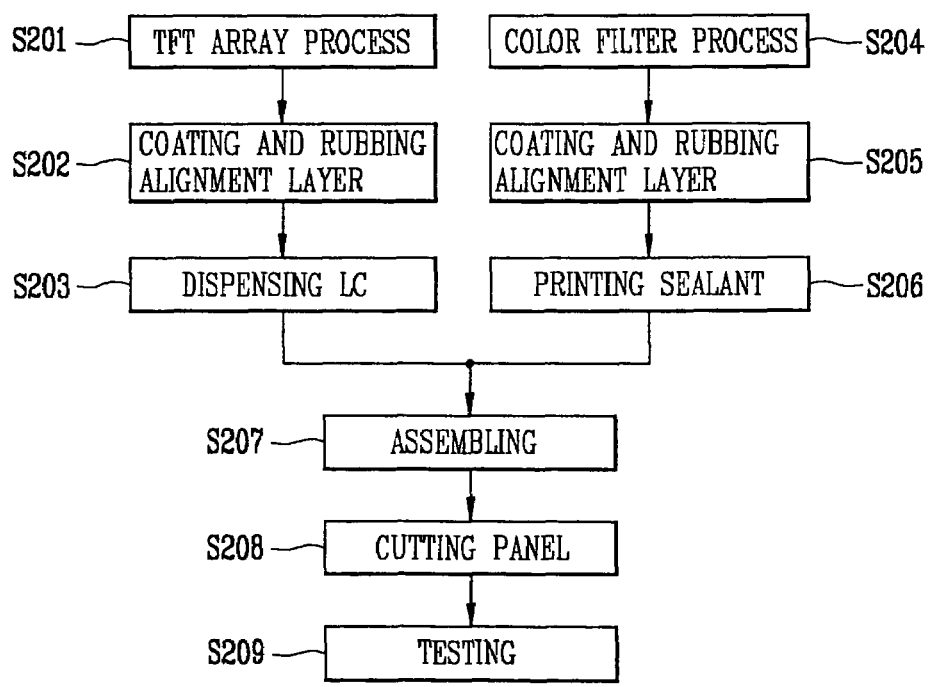
FIG. 5 is a flow chart of a fabrication method of an LCD device by a liquid crystal dispensing method according to an embodiment of the present invention.

FIG. 5 is a flow chart of an exemplary LCD device fabrication method according to an embodiment of the present invention. In Step S201, a driving device, such as a TFT, is formed on an upper substrate using a TFT array process. In Step S204, a color filter layer is formed on a lower substrate 105 using a color filter process. The TFT array process and the color filter process, which are generally similar to those of common processes, may be preferably applied to glass substrates having a plurality of unit panel areas. Herein, the upper and lower substrates may include a glass substrate having an area about 1000×200 mm2 or more. However, glass substrates having smaller areas also may be used.

In Steps S202 and S205, alignment layers may be formed and rubbed on both the upper and lower substrates. In Step S203, liquid crystal material 107 may be dropped onto a liquid crystal display unit panel area of the lower substrate 105. In Step S206, sealant 109 is applied, by printing or other suitable technique, along at least an outer perimeter portion area of the liquid crystal display unit panel area on the upper substrate.

In Step S207, the upper and lower substrates are disposed to face each other, and compressed to join the upper and lower substrates with each other using the sealant. Accordingly, the dropped liquid crystal material evenly spreads out between the upper and lower substrates and the sealant. In Step S208, the assembled upper and lower substrates are processed and cut into a plurality of liquid crystal display unit panels. In Step S209, the liquid crystal display unit panels are tested.

Figure 1:
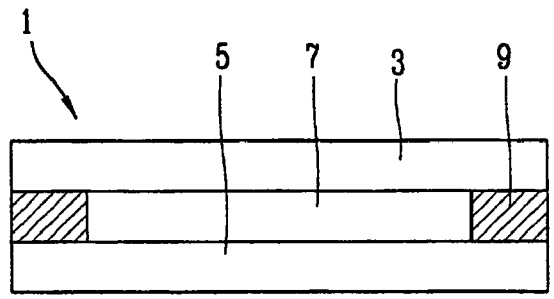
FIG. 1 is a cross sectional view of a liquid crystal display (LCD) device according to the related art.
Figure 2:
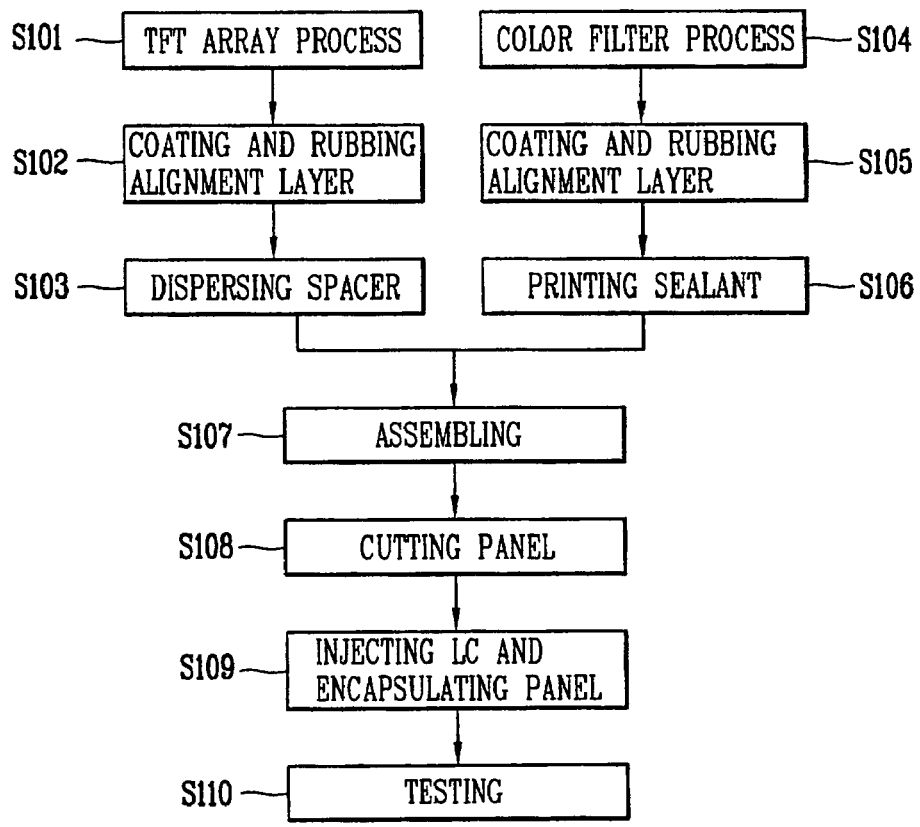
FIG. 2 is a flow chart of a fabrication method for an LCD device according to the related art.
Figure 3:
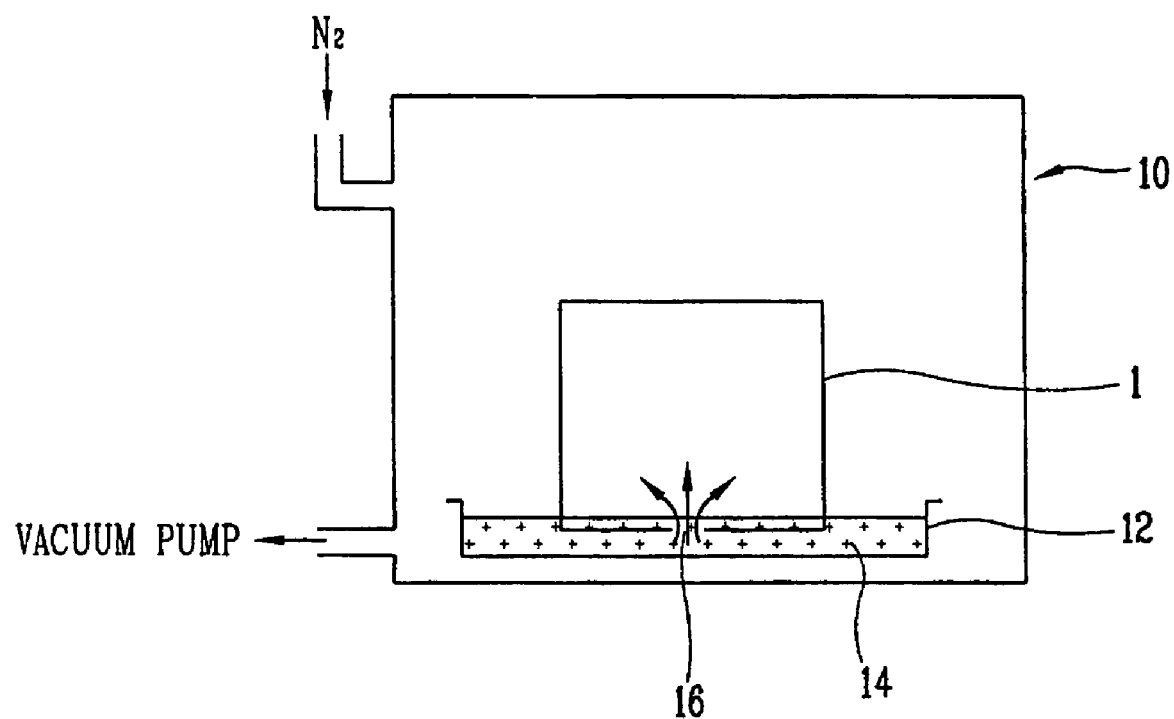
FIG. 3 is a schematic view of a liquid crystal injection system for fabricating an LCD device according to the related art.

The LCD device fabrication method using the liquid crystal dropping method of FIG. 5 is different from the LCD device fabrication method using the related art liquid crystal injection method in that a vacuum injection of liquid crystal is not used but rather a liquid crystal dropping, thereby reducing the processing time of a large area glass substrate. That is, in the LCD device fabrication method using the liquid crystal injection method of FIG. 2, liquid crystal is injected through an injection hole and then the injection hole is sealed by a sealant. However, in the LCD device fabrication method using the liquid crystal dropping method, liquid crystal is directly dropped onto the substrate and does not require the process sealing of the injection hole. Although not shown in FIG. 2, in the LCD device fabrication method using the liquid crystal injection method, the substrate is contacting the liquid crystal at the time of injecting liquid crystal so that an outer surface of the panel is contaminated by the liquid crystal. Therefore, a process for washing the contaminated substrate is required. However, in the LCD device fabrication method using the liquid crystal dropping method, liquid crystal is directly dropped onto the substrate so that the panel is not contaminated by the liquid crystal, and a washing process is not required. The LCD device fabrication method using the liquid crystal dropping method is more simple than the LCD device fabrication method using the liquid crystal injection method, thereby having an increased fabricating efficiency and an increased yield.

In the LCD device fabrication method using the liquid crystal dropping method, a dropping position of liquid crystal and a dropping amount of liquid crystal have the most influence on forming a liquid crystal layer with a desired thickness. Especially, since the thickness of a liquid crystal layer is closely related to a cell gap of a liquid crystal panel, a precise dropping position of liquid crystal and a precise amount of liquid crystal are very important to prevent inferiority of a liquid crystal panel. To drop a precise amount of liquid crystal onto a precise position, a liquid crystal dispenser is provided in the present invention.

Figure 6:
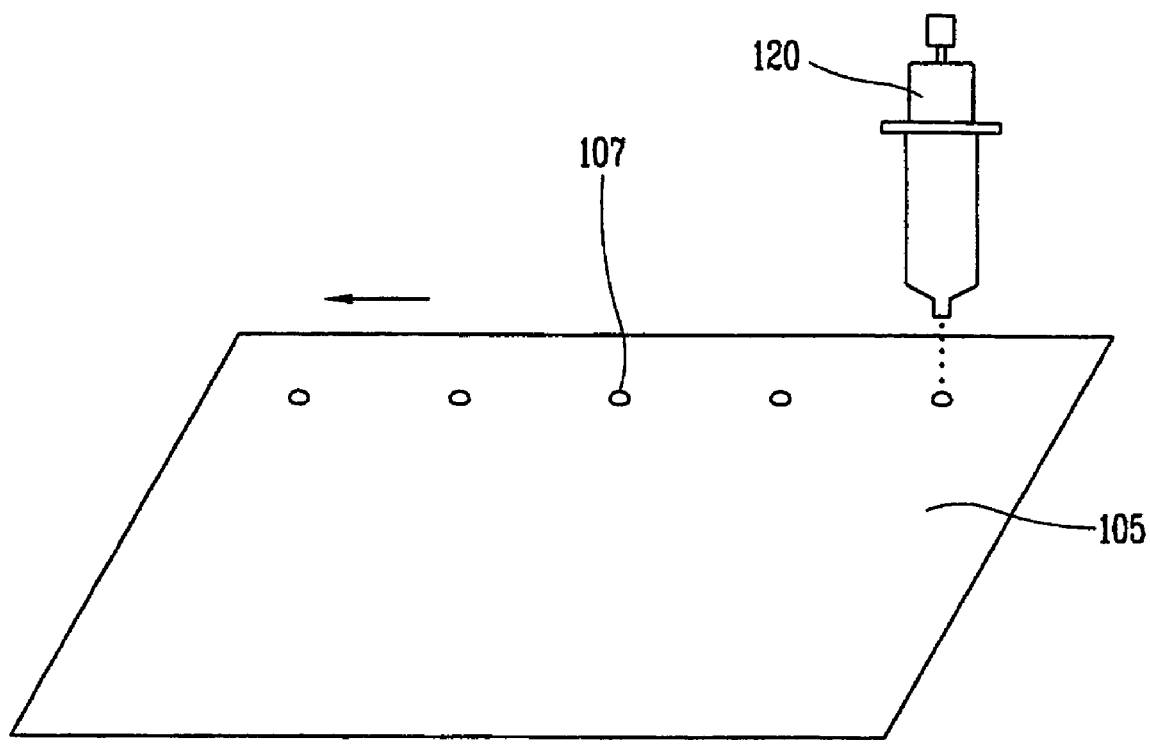
FIG. 6 is a view of a basic concept of a liquid crystal dispensing method.

FIG. 6 is a perspective view of another exemplary LCD device fabrication method according to an embodiment of the present invention. In FIG. 6, liquid crystal material 107 is dispensed onto a glass substrate 105 using a liquid crystal dispenser 120 positioned above the glass substrate 105. Although not shown, the liquid crystal material 107 may be contained in the liquid crystal dispenser 120. As the liquid crystal material 107 is dropped onto the glass substrate 105, the glass substrate 105 is moved along x- and y-directions at a predetermined speed, while the liquid crystal dispenser 120 discharges the liquid crystal material 107 at predetermined time intervals. Accordingly, the liquid crystal material 107 dropping onto the glass substrate 105 may be arranged along x- and y-directions with predetermined intervals therebetween. Alternatively, the glass substrate 105 may be fixed while the liquid crystal dispenser 120 moves along the x- and y-directions to drop the liquid crystal material 107 at predetermined intervals. However, a shape of the liquid crystal material 107 may be altered by any vibration of the liquid crystal dispenser 120, whereby errors in the dropping position and the dropping amount of the liquid crystal material 107 may occur. Therefore, it may be preferable that the liquid crystal dispenser 120 be fixed and that the glass substrate 105 be moved.

Figure 7:
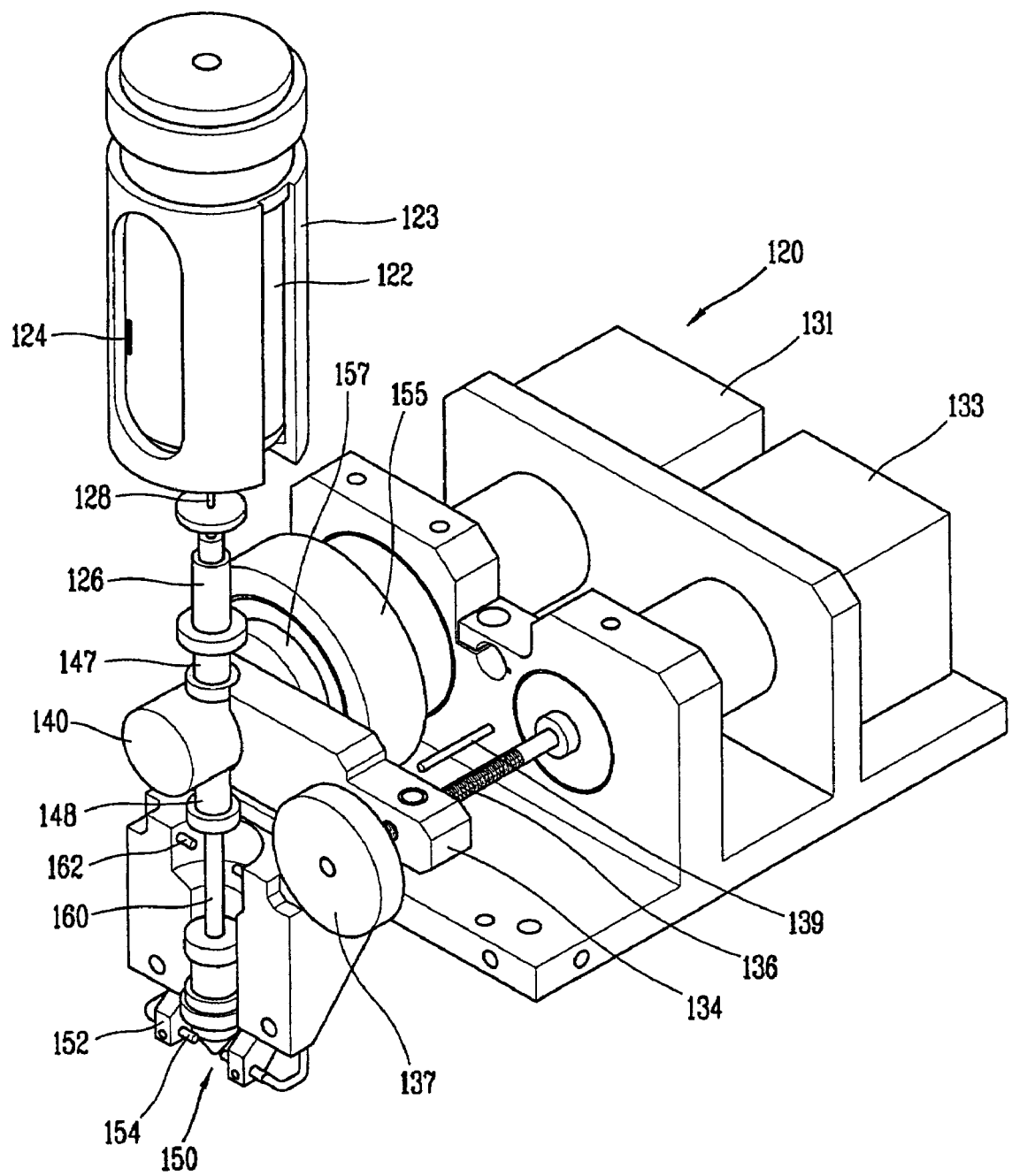
FIG. 7 is a perspective view of a liquid crystal dispenser according to an embodiment of the present invention.
Figure 8:
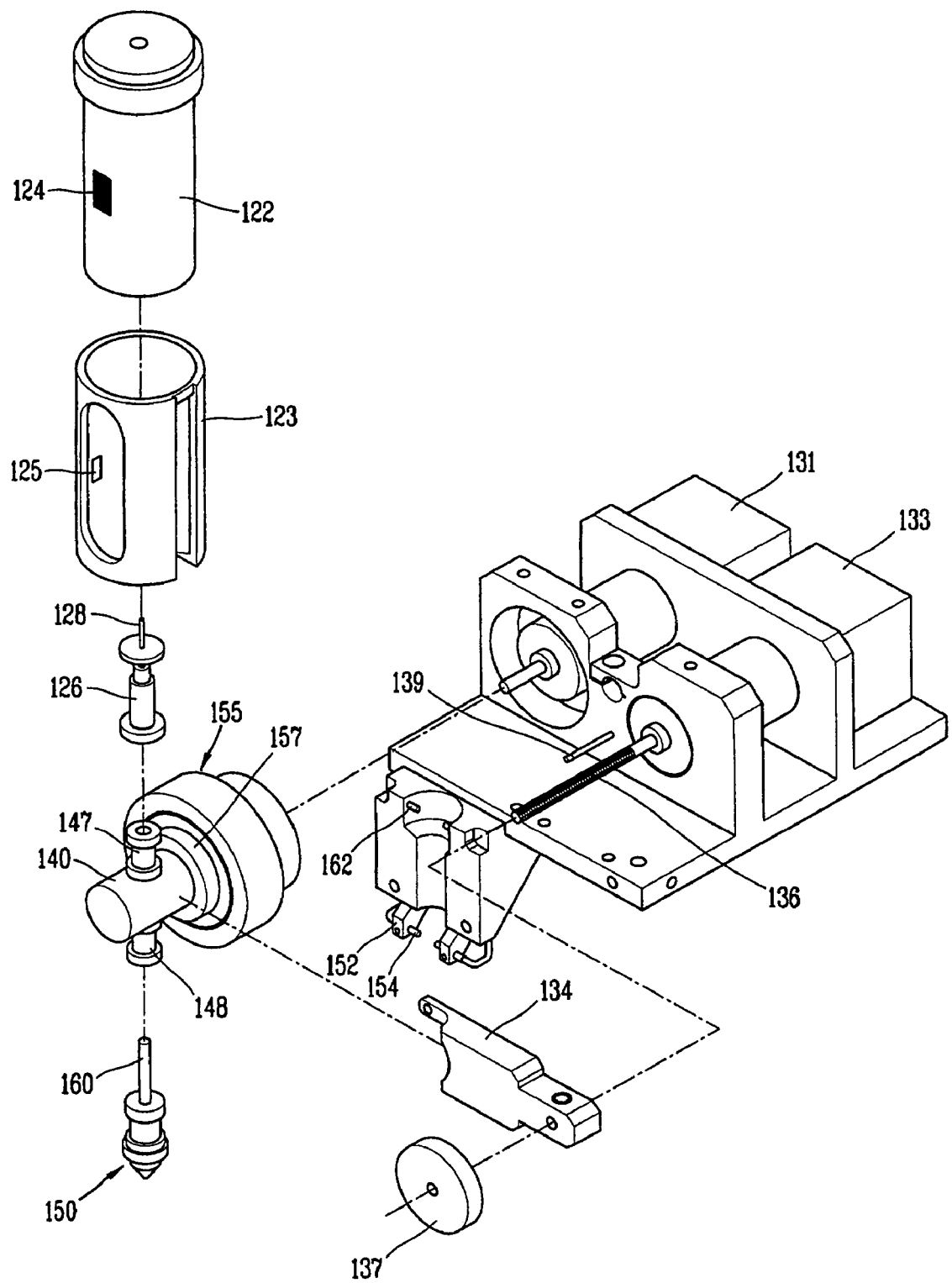
FIG. 8 is a disassembled perspective view of the liquid crystal dispenser according to an embodiment of the present invention.

FIG. 7 is a perspective view of the liquid crystal dispenser according to an embodiment of the present invention, and FIG. 8 is a disassembled perspective view of the liquid crystal dispenser according to an embodiment of the present invention. In FIGS. 7A and 7B, the liquid crystal dispenser 120 may include a cylindrically shaped liquid crystal material container 122 accommodated in a case 123. The liquid crystal material container 122 is formed of polyethylene, and the liquid crystal 107 is contained in the liquid crystal material container 122. The case 123 is formed of a stainless steel and accommodates the liquid crystal material container 122 therein. Since the polyethylene has a high plasticity, a container of a desired shape can be easily formed with the polyethylene. Also, the polyethylene is non-reactive with the liquid crystal material 107 when the liquid crystal material 107 is contained therein, thereby being mainly used as the liquid crystal material container 122. However, the polyethylene has a low strength and may therefore become easily deformed by application of stress. When the liquid crystal material container 122 is deformed, the liquid crystal material 107 may not be precisely dispensed onto a substrate. Accordingly, the liquid crystal material container 122 may be inserted within the case 123 formed of stainless steel having a high strength.

Although not shown, a gas supply tube may be arranged at an upper portion of the liquid crystal material container 122 so that inert gas, such as nitrogen, may be provided thereto. The gas is supplied within portions of the liquid crystal material container 122 not occupied by the liquid crystal material 107. Accordingly, the gas presses on the liquid crystal material 107 and induces the liquid crystal material to be dispensed onto the substrate.

A recognition code, such as a bar code 124, is formed at an outer wall surface of the liquid crystal material container 122. The bar code 124 includes information of liquid crystal contained in the liquid crystal material container 122. A bar code reader 125 for reading the bar code 124 when the liquid crystal material container 122 is accommodated in and 122 received in the case 123. Therefore, the bar code 124 of the liquid crystal material container 122 received in the case 123 is read by the bar code reader 125, and the read information is input to a control unit which is not shown in the drawing.

The liquid crystal material container 122 may include a material that does not deform, such as stainless steel. Accordingly, when the liquid crystal material container 122 is formed of stainless steel, the case 123 may not be required, thereby reducing fabrication costs of the liquid crystal dispenser 120. The interior of the liquid crystal material container 122 may be coated with a fluorine resin, thereby preventing the liquid crystal material 107 contained within the liquid crystal material container 122 from chemically reacting with sidewalls of the liquid crystal material container 122.

When the liquid crystal material container 122 is formed of metal so that the case 123 is not required, the bar code reader may be installed at a position other than the liquid crystal case. The bar code reader may be installed anywhere at the time of installing the liquid crystal material container 122 to the liquid crystal dispenser 120 so long as the bar code reader can read the bar code 124 of the liquid crystal material container 122. For example, the bar coder reader can be installed at a frame to which the liquid crystal dispenser 120 is installed or at a specific position of the liquid crystal dispenser 120. Also, the bar code reader can be connected to the liquid crystal dispenser 120 by a wire or wireless connection with the bar code reader installed separately from the liquid crystal dispenser 120.

A liquid crystal discharge pump 140 is arranged at a lower portion of the liquid crystal material container 122. The liquid crystal discharge pump 140 is for discharging a certain amount of liquid crystal from the liquid crystal material container 122 to be dropped onto a substrate. The liquid crystal discharge pump 140 is provided with a liquid crystal suction opening 147 connected to the liquid crystal material container 122 for drawing in liquid crystal in accordance with the operation of the liquid crystal discharge pump 140, and a liquid crystal discharge opening 148 at the opposite side of the liquid crystal suction opening 147 for discharging liquid crystal in accordance with the operation of the liquid crystal discharge pump 140.

In FIG. 8, a first connecting tube 126 is coupled to the liquid crystal suction opening 147. Although the liquid crystal suction opening 147 is coupled to the first connecting tube 126 by being inserted in the drawing, the liquid crystal suction opening 147 can be coupled to the first connecting tube 126 by a coupling member such as a screw. A pin 128 such as an injection needle of which inside is penetrated is formed at one side of the first connecting tube 126. A pad (not shown) formed of a material having a high contraction characteristic and a hermetic characteristic such as silicon or butyl rubber group material is arranged at a lower portion of the liquid crystal material container 122 for discharging liquid crystal to the first connecting tube 126. The pin 128 is inserted into the liquid crystal material container 122 through the pad, thereby introducing the liquid crystal 107 of the liquid crystal material container 122 into the liquid crystal suction opening 147. When the pin 128 is inserted into the liquid crystal material container 122, the pad forms a seal around the pin 128, thereby preventing leakage of the liquid crystal 107 to the insertion region of the pin 128. Since the liquid crystal suction opening 147 and the liquid crystal material container 122 are coupled to each other by the pin and the pad, the coupling structure is simple and the coupling/detachment is facilitated. Alternatively, the liquid crystal suction opening 147 and the first connecting tube 126 may be formed as a unit. In this case, the pin 128 is formed at the liquid crystal suction opening 147 and is directly inserted into the liquid crystal material container 122 to discharge liquid crystal, thereby having a simple structure.

A nozzle 150 is formed at a lower portion of the liquid crystal discharge pump 140. The nozzle 150 is connected to the liquid crystal discharge opening 148 of the liquid crystal discharge pump 140 through a second connecting tube 160, thereby dropping the liquid crystal 107 discharged from the liquid crystal discharge pump 140 onto the substrate. The second connecting tube 160 may be formed of an opaque material. However, the second connecting tube 160 is preferably formed of a transparent material due to the following reasons.

At the time of the liquid crystal dropping, vapor is contained in the liquid crystal 107 and a dispensing amount of the liquid crystal 107 dispensed onto the substrate can not be precisely controlled. Therefore, the vapor has to be removed at the time of the liquid crystal dropping. The vapor is already contained in the liquid crystal 107 to be contained in the liquid crystal material container 122. Even if the vapor contained in the liquid crystal 107 can be removed by a vapor removing device, the vapor is not completely removed. Also, vapor may be generated when the liquid crystal 107 is introduced into the liquid crystal discharge pump 140 from the liquid crystal material container 122. Accordingly, it is impossible to completely remove the vapor contained in the liquid crystal 107. Therefore, it preferred to remove vapor by stopping the operation of the liquid crystal dispenser at the time of the vapor occurrence. Thus by forming the second connecting tube 160 of a transparent material, inferiority of the LCD device can be prevented by easily finding vapor contained in the liquid crystal material container 122 or vapor generated from the liquid crystal material container 122. The vapor can be found by the user's naked eyes, and can be automatically detected by a first sensor 162 such as a photo coupler installed at both sides of the second connecting tube 160, in which the latter case can prevent the inferiority of the LCD device with more certainty.

The nozzle 150 into which the discharged liquid crystal is introduced through the second connecting tube 160 is provided with a protection unit 152 for protecting the nozzle 150 from external stress and etc. at both side surfaces thereof. Also, a second sensor 154 for detecting whether vapor is contained in the liquid crystal dropped from the nozzle 150 or whether liquid crystal masses on the surface of the nozzle 150 is installed at the protection unit 152 at the lower portion of the nozzle 150.

The phenomenon that the liquid crystal masses on the surface of the nozzle 150 prevents a precise dropping of the liquid crystal 107. When the liquid crystal drops through the nozzle 150, a certain amount of liquid crystal spreads on the surface of the nozzle 150 even if a preset amount of liquid crystal is discharged from the liquid crystal discharge pump 140. According to this, an amount of liquid crystal less than the preset amount is dispensed onto the substrate. Also, when the liquid crystal that masses on the surface of the nozzle 150 drops on the substrate, inferiority of the LCD device may be generated. To prevent the liquid crystal from massing on the surface of the nozzle 150, material such as fluorine resin having a high contact angle with liquid crystal, that is a hydrophobic material, may be deposited on the surface of the nozzle 150 by a dipping method or a spray method. By the deposition of the fluorine resin, the liquid crystal does not spread on the surface of the nozzle 150 but is dispensed onto the substrate through the nozzle 150 as a perfect drop shape.

The liquid crystal discharge pump 140 is in a state of being inserted into a rotating member 157, and the rotating member 157 is fixed to a fixing unit 155. The rotating member 157 is connected to a first motor 131. As the first motor 131 is operated, the rotating member 157 is rotated and the liquid crystal discharge pump 140 fixed to the rotating member 157 is operated.

The liquid crystal discharge pump 140 is in contact with one side of a liquid crystal capacity amount controlling member 134 having a bar shape. A hole is formed at another side of the liquid crystal capacity amount controlling member 134, and a rotational shaft 136 is inserted into the hole. A screw is provided at the perimeter of the hole of the liquid crystal capacity amount controlling member 134 and the rotational shaft 136 so that the liquid crystal capacity amount controlling member 134 and the rotational shaft 136 are screw-coupled to each other. One end of the rotational shaft 136 is connected to a second motor 133, and another end thereof is connected to a controlling lever 137.

The discharge amount of liquid crystal from the liquid crystal material container 122 through the liquid crystal discharge pump 140 is varied according to a fixation angle of the liquid crystal discharge pump 140 to the rotating member 157. That is, a liquid crystal capacity amount of the liquid crystal discharge pump 140 is varied according to an angle that the liquid crystal discharge pump 140 is fixed to the rotating member 157. When the second motor 133 connected to the rotational shaft 136 is driven (automatically controlled) or the controlling lever 137 is operated (manually controlled), the rotational shaft 136 is rotated. According to this, one end of the liquid crystal capacity amount controlling member 134 screw-coupled to the rotational shaft 136 moves back and forth (linear direction) along the rotational shaft 136. Accordingly, as one end of the liquid crystal capacity amount controlling member 134 moves, a force applied to the liquid crystal discharge pump 140 is varied, and therefore, the fixation angle of the liquid crystal discharge pump 140 is varied.

As aforementioned, the first motor 131 operates the liquid crystal discharge pump 140 to discharge liquid crystal of the liquid crystal material container 122 and to drop the liquid crystal onto the substrate. Also, the second motor 133 controls the fixation angle of the liquid crystal discharge pump 140 fixed to the rotating member 157 to control the amount of liquid crystal discharged from the liquid crystal discharge pump 140.

A single dispensing amount of liquid crystal dropped onto the substrate through the liquid crystal discharge pump 140 is very minute, and therefore, a variation amount of the liquid crystal discharge pump 140 controlled by the second motor 133 is also minute. Accordingly, to control the discharge amount of the liquid crystal discharge pump 140, an inclination angle of the liquid crystal discharge pump 140 has to be controlled very precisely. For the precise control, a step motor operated by a pulse input value is preferably used as the second motor 133.

Figure 9A:
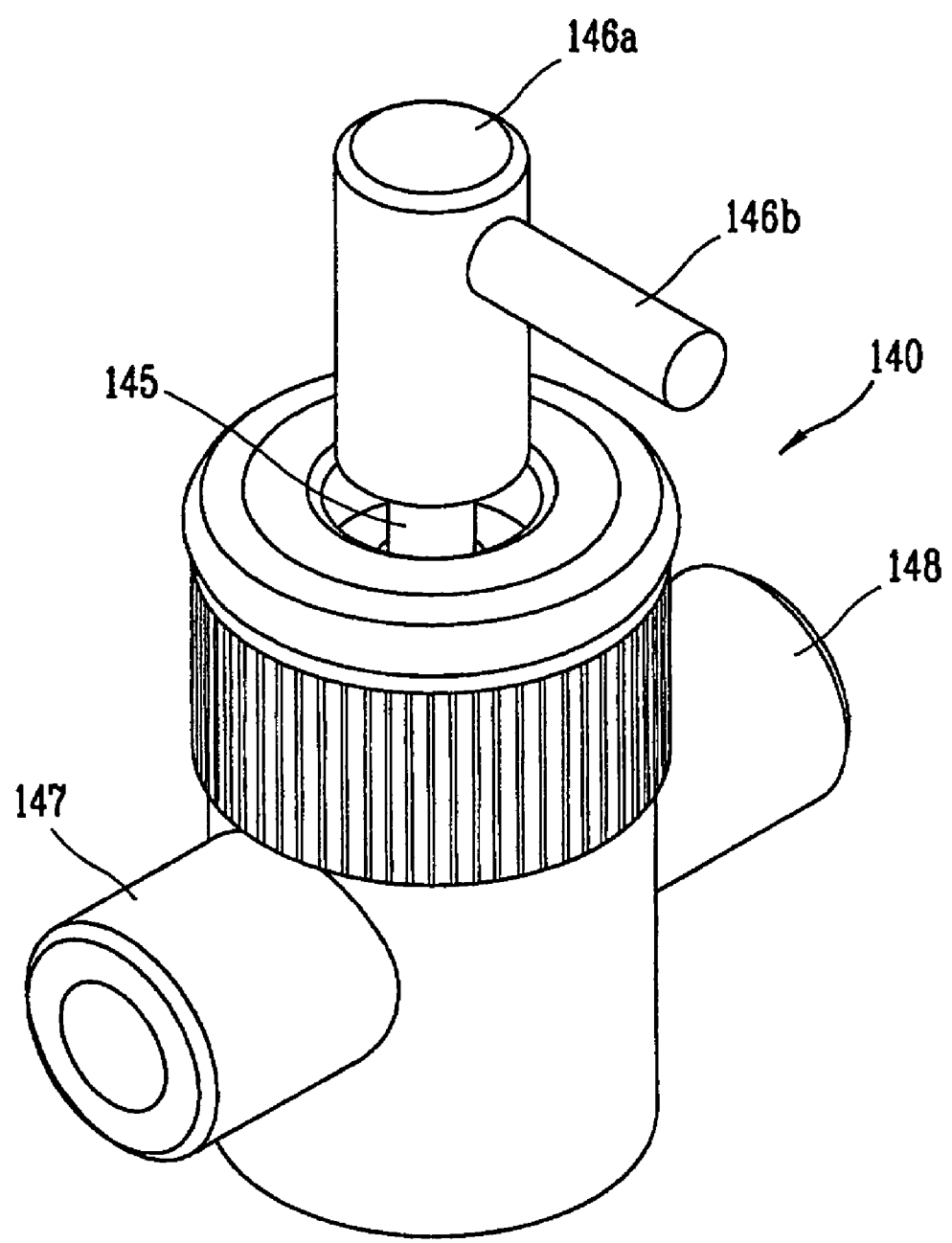
FIG. 9A is a perspective view of a liquid crystal discharge pump of the liquid crystal dispenser according to an embodiment of the present invention.
Figure 9B:
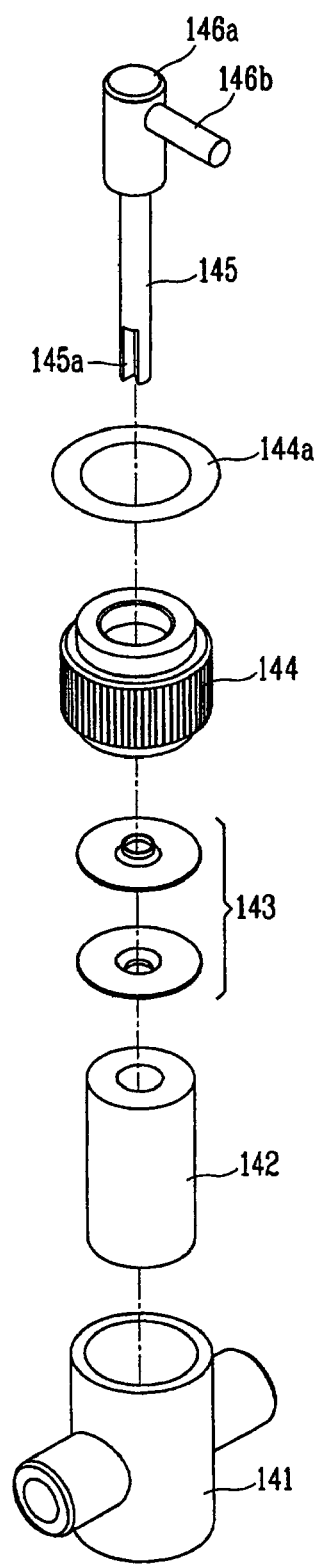
FIG. 9B is a disassembled perspective view of the liquid crystal discharge pump.

FIG. 9A is a perspective view of the liquid crystal discharge pump, and FIG. 9B is a disassembled perspective view of the liquid crystal discharge pump. In FIGS. 9A and 9B, the liquid crystal discharge pump 140 includes: a case 141 having the liquid crystal suction opening 147 and the liquid crystal discharge opening 148; a cap 144 having an opening at an upper portion thereof and coupled to the case 141; a cylinder 142 inserted into the case 141 for drawing in liquid crystal; a sealing member 143 for sealing the cylinder 142; an O-ring 144a positioned above the cap 144 for preventing liquid crystal from being leaked; and a piston 145 up-down moved and rotated by being inserted into the cylinder 142 through the opening of the cap 144, for drawing in and discharging the liquid crystal 107 through the liquid crystal suction opening 147 and the liquid crystal discharge opening 148. A head 146a fixed to the rotating member 157 is installed above the piston 145, and a bar 146b is installed at the head 146a. The bar 146b is inserted into a hole (not shown) of the rotating member 157 and is fixed, thereby rotating the piston 145 when the rotating member 157 is rotated by a force of the first motor 131.

In FIG. 9B, a groove 145a is formed at the end of the piston 145. The groove 145a has an area corresponding to approximately ¼ (or less than that) of a sectional area of a circle shape of the piston 145. The groove 145a opens and closes the liquid crystal suction opening 147 and the liquid crystal discharge opening 148 when the piston 145 is rotated (that is, moved up and down), thereby drawing in and discharging liquid crystal through the liquid crystal suction opening 147 and the liquid crystal discharge opening 148.

Operation of the liquid crystal discharge pump 140 will be explained as follows.

Figure 10:
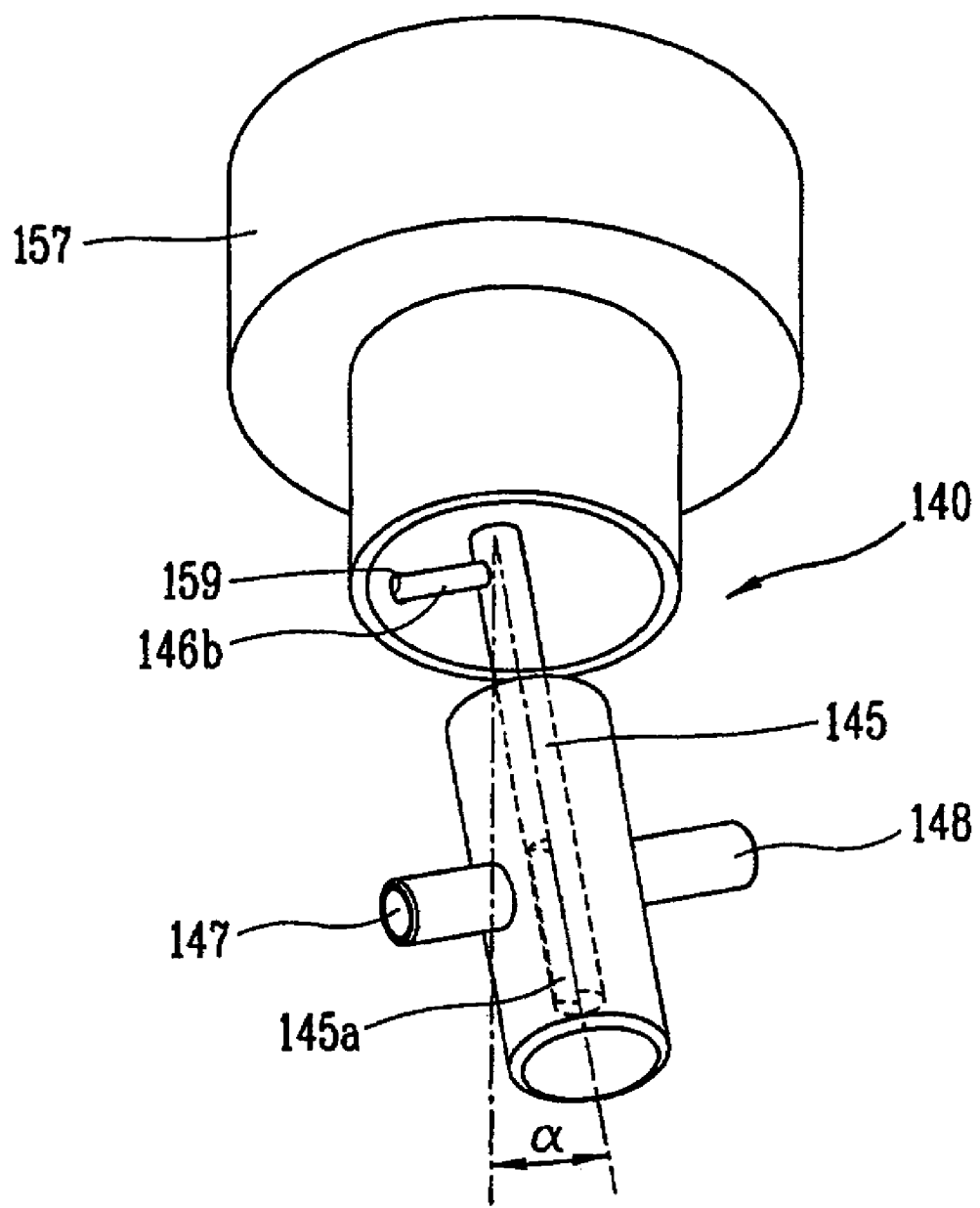
FIG. 10 is a view showing a state that the liquid crystal discharge pump is fixed to a fixing unit.

FIG. 10 is a view showing a state that the liquid crystal discharge pump 140 is fixed to the rotating member 157. In FIG. 10, the piston 145 is fixed to the rotating member 157 with a certain angle (α). The bar 146b formed at the piston head 146a is inserted into a hole 159 formed inside the rotating member 157 so that the piston 145 and the rotating member 157 are coupled to each other. Although not shown, a bearing is provided inside the hole 159 and thereby the bar 146b of the piston 145 inserted into the hole 159 can move back and forth and right and left. When the first motor 131 is operated, the rotating member 157 is rotated and thereby the piston 145 coupled to the rotating member 157 is rotated.

Herein, if the fixation angle (α) of the liquid crystal discharge pump for the rotating member 157, that is, the fixation angle (α) of the piston 145 for the rotating member 157 is supposed to be 0, the piston 145 performs only a rotational motion along the rotating member 157. However, since the fixation angle (α) of the piston 145 is not substantially zero (that is, the piston 145 is fixed with a certain angle), the piston 145 not only rotates along the rotating member 157 but also up-down moves.

If the piston 145 moves upwardly by rotating with a certain angle, a space is formed inside the cylinder 142 and liquid crystal is drawn into the space through the liquid crystal suction opening 147. Then, if the piston 145 moves downwardly by rotating more, the liquid crystal in the cylinder 142 is discharged through the liquid crystal discharge opening 148. Herein, the groove 145a formed at the piston 145 opens and closes the liquid crystal suction opening 147 and the liquid crystal discharge opening 148 at the time of drawing in and discharging the liquid crystal by the rotation of the piston 145.

Figure 11A:
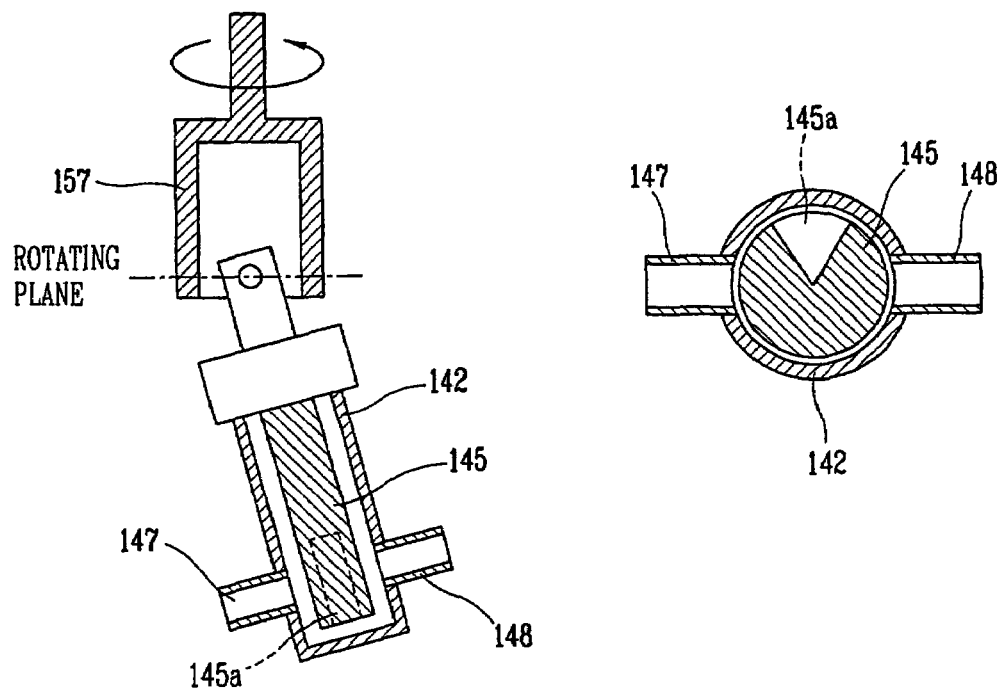
FIGS. 11A to 11D are operational views of the liquid crystal discharge pump.
Figure 11B:
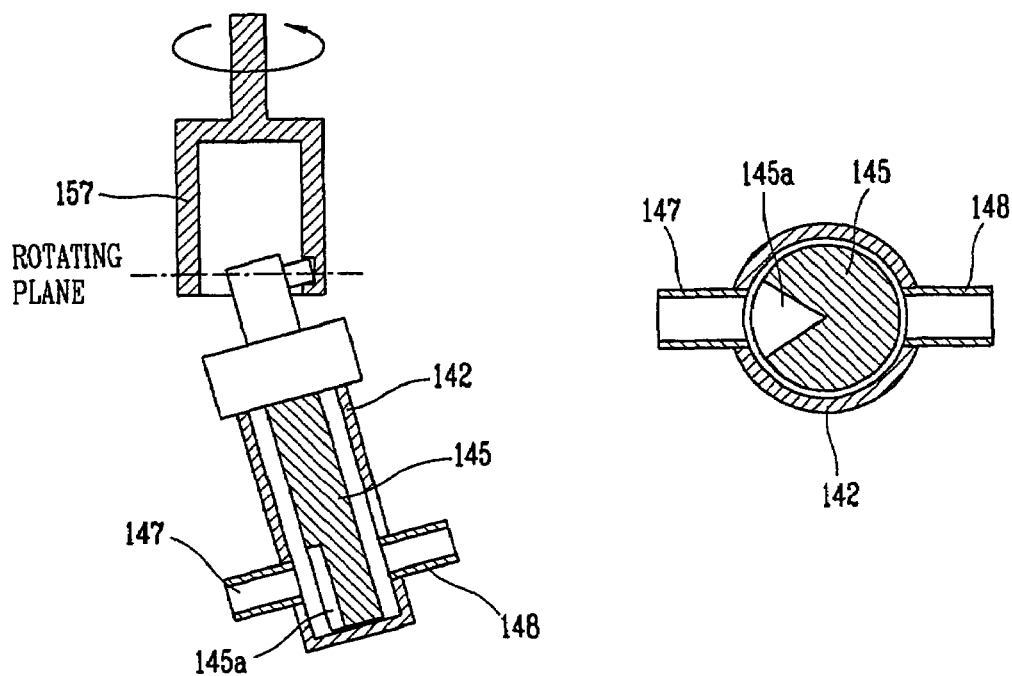
Figure 11C:
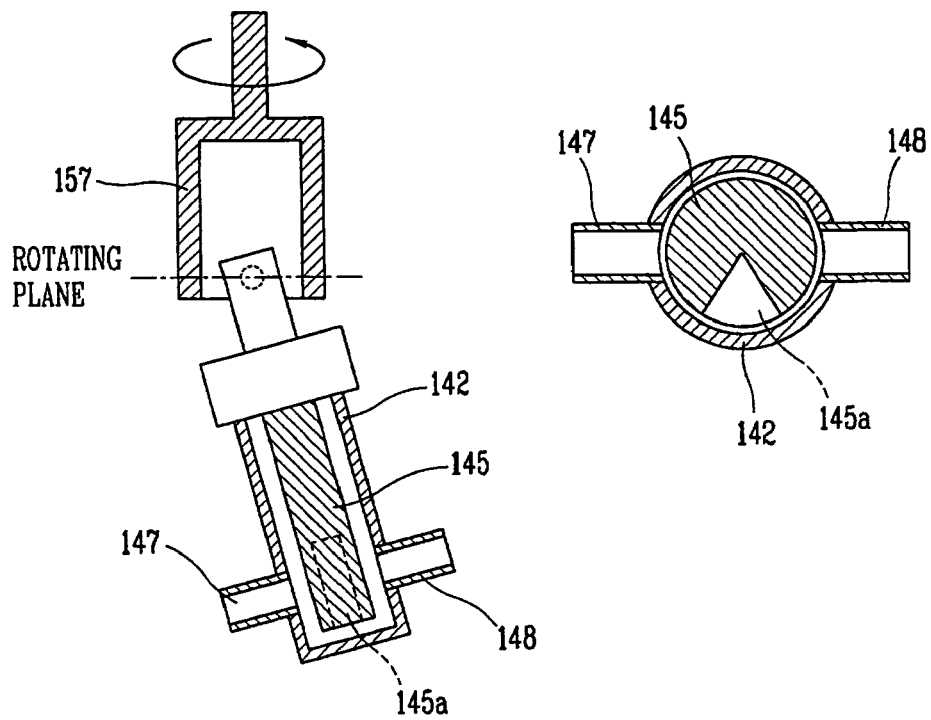
Figure 11D:
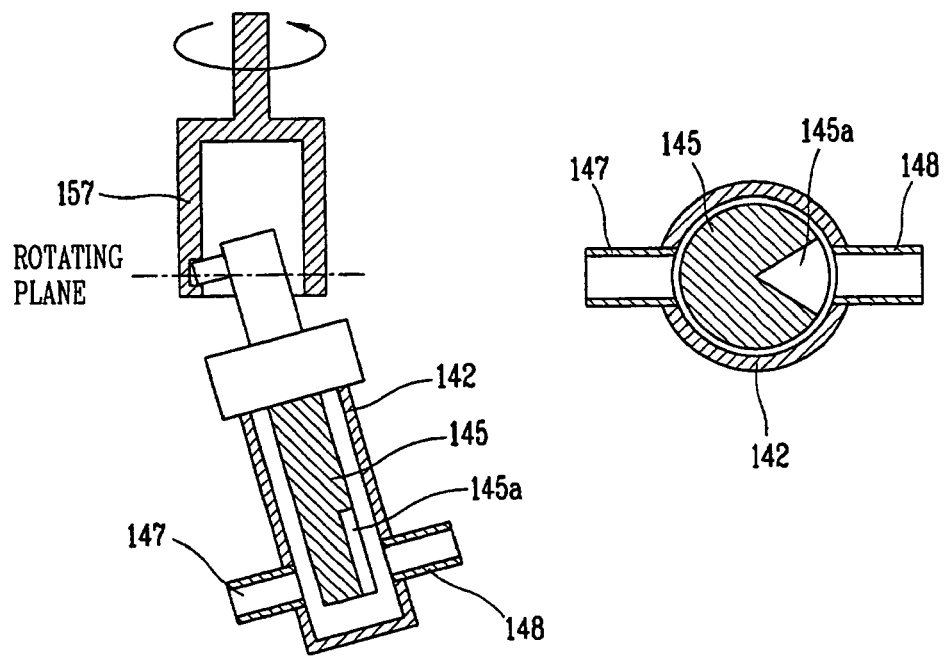

Hereinafter, operation of the liquid crystal disc charge pump 140 will be explained in more detail with reference to FIGS. 11A to 11D. In FIGS. 11A to 11D, the liquid crystal discharge pump 140 discharges the liquid crystal 107 of the liquid crystal material container 122 to the nozzle 150 through 4 strokes. FIGS. 11A and 11C are cross strokes, FIG. 11B is a suction stroke through the liquid crystal suction opening 147, and FIG. 11D is a discharge stroke through the liquid crystal discharge opening 148.

In FIG. 11A, the piston 145 fixed to the rotating member 157 with a certain angle (a) rotates accordingly as the rotating member 157 rotates. At this time, the liquid crystal suction opening 147 and the liquid crystal discharge opening 148 are closed by the piston 145.

When the rotating member 157 rotates with approximately 45°, the piston 145 rotates and the liquid crystal suction opening 147 is open by the groove 145a of the piston 145 as shown in FIG. 11B. The bar 146b of the piston 145 is inserted into the hole 159 of the rotating member 157, thereby coupling the rotating member 157 and the piston 145. Accordingly, as the rotating member 157 rotates, the piston 145 rotates. At this time, the bar 146b rotates along a rotating plane.

Since the piston 145 is fixed to the rotating member 157 with a certain angle and the bar 146b rotates along the rotating plane, the piston 145 moves upwardly accordingly as the rotating member 157 rotates. Also, accordingly as the rotating member 157 rotates, a space is formed at the cylinder 142 positioned at the lower portion of the piston 145 since the cylinder 142 is fixed. Therefore, liquid crystal is drawn into the space through the liquid crystal suction opening 147 that has been open by the groove 145a. The suction stroke of liquid crystal continues until the suction stroke of FIG. 11C starts (the liquid crystal suction opening 147 is closed) as the rotating member 157 rotates with approximately 45° after the suction stroke starts (that is, the liquid crystal suction opening 147 is open).

Then, as shown in FIG. 11D, the liquid crystal discharge opening 148 is open and the piston 145 downwardly moves accordingly as the rotating member 157 rotates more so that the liquid crystal drawn into the space inside the cylinder 142 is discharged through the liquid crystal discharge opening 148 (discharge stroke). As aforementioned, the liquid crystal discharge pump 140 repeats four strokes (that is, the first cross stroke, the suction stroke, the second cross stroke, and the discharge stroke), thereby discharging the liquid crystal 107 contained in the liquid crystal material container 122 to the nozzle 150. Herein, the discharge amount of liquid crystal is varied according to an up-down motion range of the piston 145. The up-down motion range of the piston 145 is varied according to the angle of the liquid crystal discharge pump 140 fixed to the rotating member 157.

Figure 12:
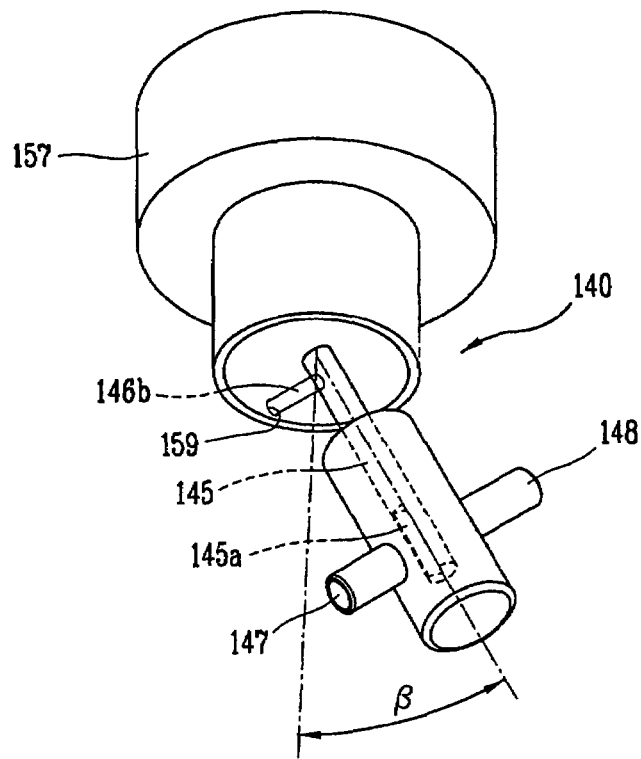
FIG. 12 is a view of the liquid crystal discharge pump of which a fixation angle has been increased.

FIG. 12 shows a liquid crystal discharge pump 140 with the piston 145 fixed to the rotating member 157 with an angle of β. When compared to the liquid crystal discharge pump 140 of FIG. 10 having the piston 145 fixed to the rotating member 157 with the angle of α, the liquid crystal discharge pump 140 of FIG. 12 having the piston 145 fixed to the rotating member 157 with an angle of β(>α) enables the piston 145 to upwardly move more highly. That is, the greater the angle of the liquid crystal discharge pump 140 relative to the rotating member 157 is, the greater the amount of the liquid crystal 107 drawn into the cylinder 142 at the time of the piston motion is. This means that the discharge amount of liquid crystal can be controlled by adjusting the angle of the liquid crystal discharge pump 140 fixed to the rotating member 157.

The angle of the liquid crystal discharge pump 140 fixed to the rotating member 157 is controlled by the liquid crystal capacity amount controlling member 134 of FIG. 7, and the liquid crystal capacity amount controlling member 134 is moved by driving the second motor 133. That is, the angle of the liquid crystal discharge pump 140 fixed to the rotating member 157 is controlled by controlling the second motor 133.

The fixation angle of the liquid crystal discharge pump 140 can be manually adjusted by handling the angle controlling lever 137 by the user. However, in this case, a precise adjustment is not possible, a lot of time is required, and the driving of the liquid crystal discharge pump has to be stopped during the operation. Therefore, it is preferable to adjust the fixation angle of the liquid crystal discharge pump 140 by the second motor 133. The fixation angle of the liquid crystal discharge pump 140 is measured by a sensor 139 such as a linear variable differential transformer. If the fixation angle exceeds a preset angle, the sensor 139 rings the alarm thus to prevent the liquid crystal discharge pump 140 from being damaged.

Although not shown, the second motor 133 is connected to a control unit by wire or wirelessly. Each kind of information such as a preset dispensing amount of liquid crystal and a substantially dropped amount of liquid crystal onto the substrate is input to the control unit, and a discharge amount of liquid crystal (dropped amount of liquid crystal onto the substrate) is controlled based on the input information. The bar code 124 in which information such as liquid crystal information is recorded is formed at the liquid crystal material container 122, and the information recorded in the bar code 124 is read by the bar code reader 125 to be input to the control unit.

Although not shown, the substrate onto which liquid crystal is dispensed is provided with a recognition code such as a bar code in which each kind of information is recorded. In the bar code, each kind of information such as the number of sheets of liquid crystal panels, an area of a liquid crystal panel, a display mode of a liquid crystal panel, a cell gap of a liquid crystal panel, and or a kind of liquid crystal dispensed is recorded. Also, a bar code reader for reading a bar cord of the substrate is installed at a table (not shown) of the liquid crystal dispensing system on which the substrate is loaded. The bar code reader is separately installed from the liquid crystal dispensing system to be connected to the liquid crystal dispensing system by a wired or a wireless connection. If the substrate is loaded on the table of the liquid crystal dispensing system for a liquid crystal dispensing, information read by the bar code reader is input to the control unit and a dispensing condition of the liquid crystal dispensing system is determined based on the read information.

Figure 13:
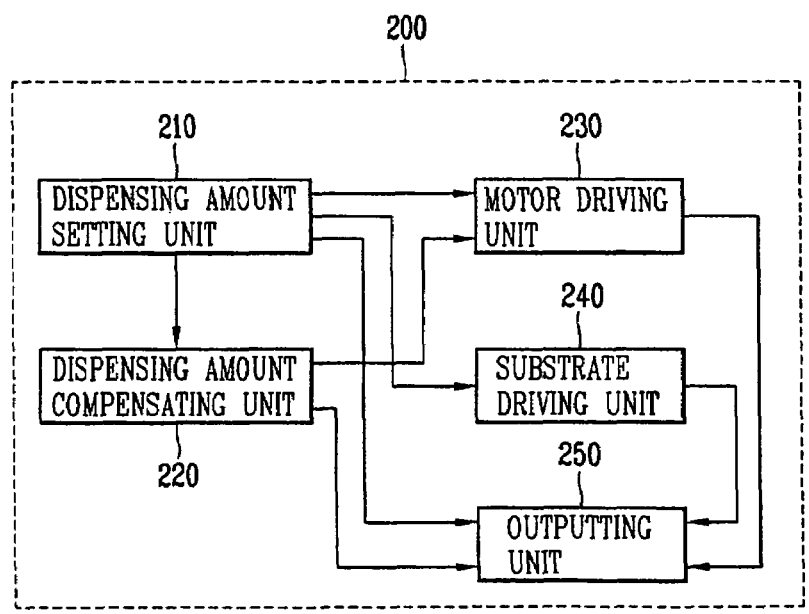
FIG. 13 is a block diagram of a control unit of a liquid crystal dispensing system according to an embodiment of the present invention.

In FIG. 13, the control unit 200 includes: a dispensing amount setting unit 210 for setting a dispensing amount of liquid crystal to be dropped onto the liquid crystal panel; a dispensing amount compensating unit 220 for compensating a dispensing amount of liquid crystal by controlling the second motor 133 (shown in FIGS. 7 and 8) and for controlling the fixation angle of the liquid crystal discharge pump 140 (shown in FIG. 12) when the preset dispensing amount of liquid crystal by the dispensing amount setting unit 210 is different from a substantial dispensing amount of liquid crystal onto the liquid crystal panel; a motor driving unit 230 for discharging the preset dispensing amount of liquid crystal by the dispensing amount setting unit 210 by the liquid crystal discharge pump 140 by controlling the first motor 131 (shown in FIGS. 7 and 8) and the second motor 133; a substrate driving unit 240 for driving the substrate and thereby aligning a dropping position of liquid crystal with the nozzle 150 (shown in FIGS. 7 and 8); and an outputting unit 250 for outputting each kind of information such as a substrate size, a panel size, a preset dispensing amount of liquid crystal, a current dispensing amount of liquid crystal, a dispensing position, and etc. and ringing an alarm at the time of an abnormality occurrence. The outputting unit 250 is formed of a display such as a cathode ray tube (CRT) or an LCD and a printer, thereby informing the user of each kind of information regarding the liquid crystal dispensing and informing the user of dropping abnormalities by an alarm or the like.

The dispensing amount setting unit 210 is for setting a dispensing amount of liquid crystal dispensed onto the liquid crystal panel. An already calculated set amount can be manually input to the dispensing amount setting unit 210 by the user. However, for a more precise dispensing amount setting, an optimum dispensing amount is automatically set on the basis of each kind of data. The data is each kind of information recorded in the bar code of the substrate such as the number of sheets of liquid crystal panels, an area of a liquid crystal panel, a display mode of a liquid crystal panel, a cell gap of a liquid crystal panel, and/or a kind of liquid crystal dispensed. On the basis of the information, a total dispensing amount of liquid crystal dispensed onto the substrate and a single dispensing amount of liquid crystal are calculated.

The data can be directly input to the liquid crystal dispensing system by the user, or can be input to the liquid crystal dispensing system from the previous processing line. Here, the thin film transistor processing line and the color filter processing line can be connected by a wire or a wireless connection. However, in the latter case, the substrate loaded on the liquid crystal dispensing system and the information input to the control unit are individually treated. Therefore, when the substrate is not precisely matched with the information, a precise dispensing amount onto a corresponding substrate can not be set, and therefore, an inferiority of the LCD device may be generated. Especially, when fabricating LCD devices of various sizes (including the size of a glass substrate) and display modes at one liquid crystal dispensing system, each substrate condition is different, and a severe problem may be generated at the time of fabricating an LCD device because the substrate and the information are not matched each other.

However, in accordance with the present invention, the bar code in which each kind of information is recorded is formed at the substrate and corresponding information is read when the substrate is loaded on the liquid crystal dispensing system. As a result, a dispensing amount of liquid crystal is set to prevent a mismatching between the substrate and the information, thereby avoiding an inferiorities in the LCD devices.

A dispensing amount of liquid crystal dispensed onto the substrate is generally very minute (e.g., several mg). To precisely dispense the minute amount of liquid crystal is very difficult, and the amount is easily varied according to each kind of factor. The dispensing amount compensating unit 220 is for compensating a varied dispensing amount of liquid crystal. When an error is generated between the dispensing amount set by the dispensing amount setting unit 210 and a substantial dispensing amount of liquid crystal onto the substrate (a measured dispensing amount), the dispensing amount setting unit 220 calculates the error value which output to the motor driving unit 230.

Figure 14:
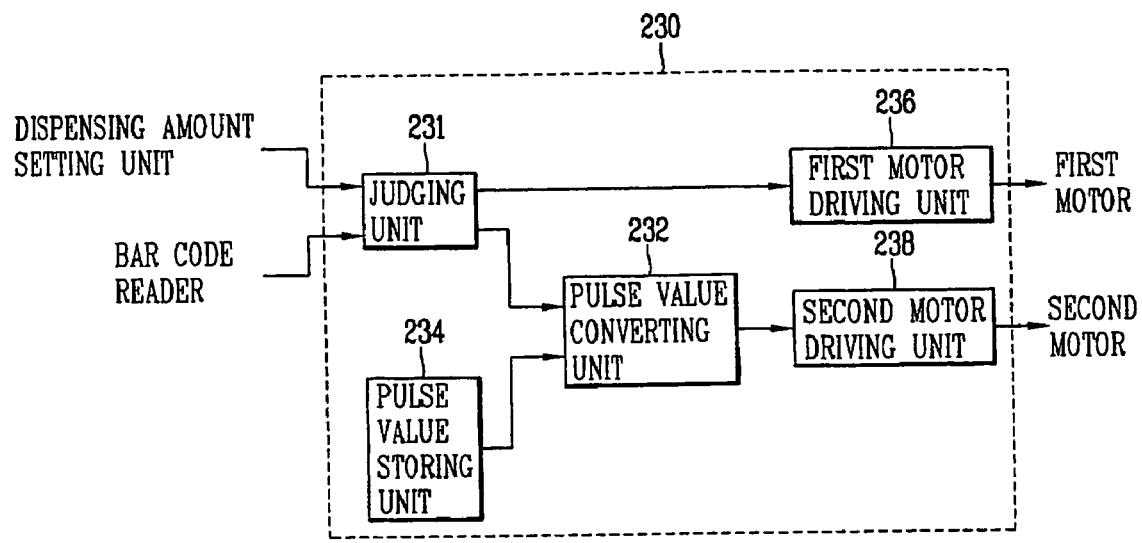
FIG. 14 is a block diagram of a motor driving unit according to an embodiment of the present invention.

In FIG. 14, the motor driving unit 230 includes: a pulse value storing unit 234 for storing pulse value information regarding a dispensing amount of liquid crystal in order to drive the first motor 131 (shown in FIGS. 7 and 8) and the second motor 133 (shown in FIGS. 7 and 8); a judging unit 231, to which substrate information recorded in a bar code of the substrate and liquid crystal information recorded in a bar code of the liquid crystal material container 122 are input, for judging whether a liquid crystal dispensing is suitable; a pulse value converting unit 232 for converting a dispensing amount setting value inputted from the dispensing amount setting unit 210 or a dispensing amount compensating value input from the dispensing amount compensating unit 220 into a pulse value based on the pulse value information stored in the pulse value storing unit 234 when the judging unit 231 judges that the liquid crystal dispensing is suitable; a first motor driving unit 236 for driving the first motor 131 according to a command for a liquid crystal dispensing is inputted from the judging unit 231; and a second motor driving unit 238 for outputting a driving signal for driving the second motor 133 according to the pulse value converted by the pulse value converting unit 232 is input, there by varying a fixation angle of the liquid crystal discharge pump 140.

The judging unit 231 compares the liquid crystal information included in the substrate information read by the bar code formed at the substrate with the liquid crystal information read by the bar code formed at the liquid crystal container (that is, information of liquid crystal contained in the liquid crystal material container). Then, if it is judged that the set liquid crystal is the liquid crystal contained in the liquid crystal material container, the judging unit 231 continues to dispense liquid crystal. However, if it is judged that the set liquid crystal is not the liquid crystal contained in the liquid crystal material container, the judging unit 231 stops the driving of the first motor 13 to stop the liquid crystal dispensing.

Much rotation angle information of the second motor 133 regarding a pulse value is stored in the pulse value storing unit 234. Therefore, as a pulse value is input, the second motor 133 is rotated as much as a corresponding angle and at the same time, the liquid crystal capacity amount controlling member 134 inserted into the rotational shaft 136 is linearly moved. Eventually, by the motion of the liquid crystal capacity amount controlling member 134, the fixation angle of the liquid crystal discharge pump 140 to a fixing unit 149 is varied, thereby varying the discharge amount of liquid crystal from the liquid crystal discharge pump 140. As aforementioned, the second motor 133 may be a step motor which is rotated one time as approximately 1000 pulses are input. That is, the second motor 133 is rotated approximately 0.36° for one pulse. Therefore, the rotation angle of the second motor 133 can be precisely controlled by a pulse, and the discharge amount of the liquid crystal discharge pump 140 can be precisely controlled.

Figure 15:
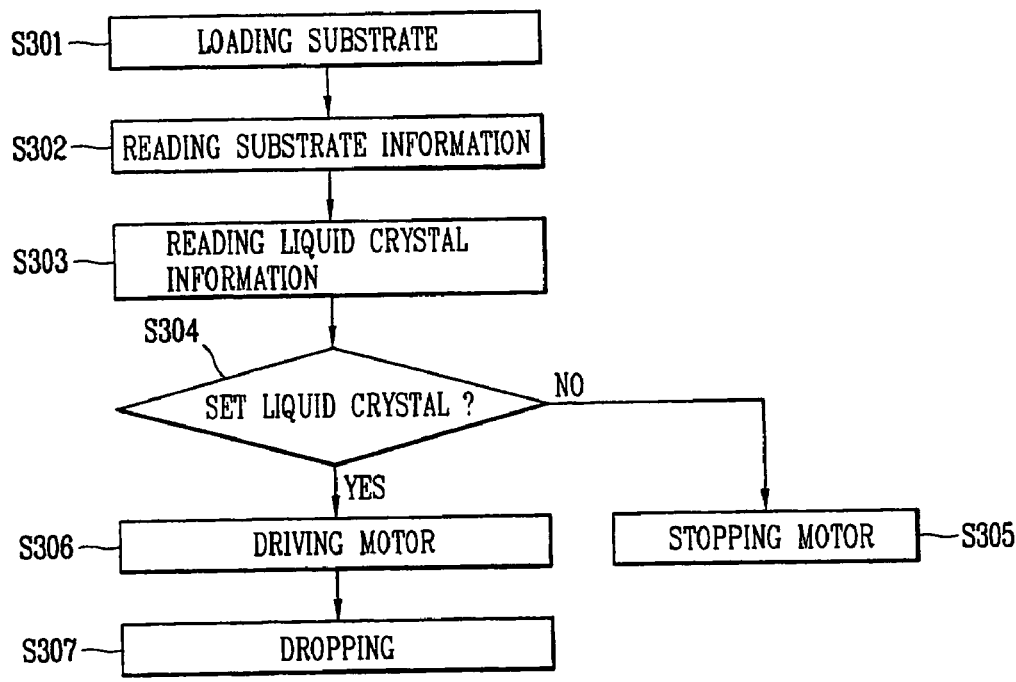
FIG. 15 is a flow chart of a liquid crystal dispensing method for dispensing liquid onto a substrate using the liquid crystal dispensing system according to the present invention.

The liquid crystal dispensing method using the exemplary liquid crystal dispenser will now be explained in more detail with reference to the attached drawings. FIG. 15 is a flow chart of the liquid crystal dispensing method onto the substrate where at least one liquid crystal panel is formed.

In FIG. 15, if the substrate is loaded onto the table of the liquid crystal dispenser 120 (S301), the recognition code (that is, the bar code) is read by a bar code reader formed at the table or by a bar code reader separately formed and communicated with the liquid crystal dispenser 120 (S302). Then, the recognition code (that is, the bar code) of the liquid crystal material container 122 is read by a bar code reader formed at the case 123 of the liquid crystal dispenser 120 or at the table or by a separately formed bar code reader (S303).

When liquid crystal recorded in the bar code of the substrate is not liquid crystal recorded in the bar code of the liquid crystal material container 122, an inferiority of the LCD device is generated when liquid crystal of a corresponding container is dispensed onto the substrate. As a result, the operation of the first motor 131 is stopped to, in turn, stop the dispensing of liquid crystal, and an alarm is rung (S305). However, if the liquid crystal recorded in the bar code of the substrate is the liquid crystal recorded in the bar code of the liquid crystal container 122, it is judged that the liquid crystal is the preset (suitable) liquid crystal. As a result, the first motor 131 is driven to continue to dispense liquid crystal. At this time, although not shown, the dispensing amount of liquid crystal is set based on the read substrate information, and the dispensing amount of liquid crystal is dispensed onto the substrate.

As aforementioned, it is judged whether a liquid crystal dispensing is to be continued or stopped based on the information recorded in the liquid crystal material container. When liquid crystal contained in the liquid crystal material container which is not the set liquid crystal is mounted at the liquid crystal dispensing system by the user's error, a liquid crystal dispensing is automatically stopped, thereby preventing an inferiority of the LCD device due to the inferiority of the liquid crystal dispensing.

In accordance with the present invention, each kind of information of the substrate is recorded in the recognition code formed at the substrate, thereby preventing the inferiority of a liquid crystal dispensing due to mis-information. Generally, substrate information is input to a liquid crystal layer forming process line (e.g., a liquid crystal dispensing process line) from the previous process, that is, the TFT process line and the color filter process line. If the substrate loaded on the liquid crystal dispensing system and the inputted information are different from each other, an inferiority of the liquid crystal dispenser is generated. In accordance with the present invention, since information of the substrate loaded on the liquid crystal dispensing system is input to the liquid crystal dispensing system, the inferiority of a liquid crystal dispensing can be prevented.

As aforementioned, substrate information is input to the liquid crystal dispenser by the recognition code formed at the substrate so that a dispensing condition such as a dispensing amount can be set real time. Accordingly, the inferiority of the LCD device due to a mis-matching between the substrate and information can be prevented. Also, the liquid crystal information is input to the liquid crystal dispenser by the bar code formed at the liquid crystal material container, thereby preventing a non-preset liquid crystal from being dispensed onto the substrate.

It should be recognized that the present invention may be varied from the exemplary embodiments shown and described. For example, the liquid crystal dispensing system may be able to read information of a liquid crystal container as described in Korean Patent Application No. 2003-41277, filed Jun. 24, 2003, which is hereby incorporated by reference. Also, the liquid crystal dispensing system may be adapted to use spacer information as described in Korean Patent Application No. 2003-41275, filed Jun. 24, 2003, which is hereby incorporated by reference.

It will be apparent to those skilled in the art that various modifications and variations can be made in the liquid crystal dispensing system and method of dispensing liquid crystal material using the same of the present invention without departing from the spirit or scope of the invention. Thus, it is intended that the present invention cover the modifications and variations of this invention provided they come within the scope of the appended claims and their equivalents.

What is claimed is:

1. A liquid crystal dispensing method, comprising:
   loading a substrate having a second code on a liquid crystal dispensing system, the second code including information of an area of the panel region, number of the panel region of the substrate, and a cell gap of the panel region;
   reading the second code;
   setting a dispensing condition of liquid crystal based on the read information of the second code;
   reading a first code having liquid crystal information in a liquid crystal container of a liquid crystal dispensing apparatus, the first code including information of liquid crystal;
   judging whether a liquid crystal dispensing is suitable by comparing the read information of the first code with the information of second code; and
   dispensing liquid crystal.

2. The method according to claim 1, wherein if it is judged that the liquid crystal dispensing is not suitable, the liquid crystal dispensing is stopped.

3. The method according to claim 1, wherein dispensing liquid crystal includes:
   driving the substrate to move a liquid crystal dispensing system to a dispensing position;
   driving a first motor to control a fixation angle of a discharge pump of the liquid crystal dispensing system in accordance with a calculated dispensing amount; and
   dispensing liquid crystal onto the substrate by driving a second motor and by operating the discharge pump.

4. A liquid crystal dispensing method, comprising:
   loading a substrate having a code on a liquid crystal dispensing system the code including information of an area of the panel region, number of the panel region of the substrate, and a cell gap of the panel region;
   reading the code;
   setting a liquid crystal dispensing condition by reading the code; and
   operating a liquid crystal discharge pump to dispense liquid crystal onto the substrate.

5. The method according to claim 4, wherein dispensing liquid crystal includes:
   driving the substrate to move a liquid crystal dispensing system to a dispensing position;
   driving a first motor to control a fixation angle of a discharge pump of the liquid crystal dispensing system in accordance with a calculated dispensing amount; and
   dispensing liquid crystal onto the substrate by driving a second motor and by operating the discharge pump.

6. A method of manufacturing a liquid crystal display device, the method comprising:
providing a first substrate;
dispensing liquid crystal from the liquid crystal dispensing system, the liquid crystal dispensing system including,
a liquid crystal material container to contain liquid crystal, the liquid crystal material container provided with a first code having information of the liquid crystal;
a reading unit to read the first code;
a discharge pump having a liquid crystal capacity amount controlling member to draw in and discharge liquid crystal from the liquid crystal material container; and
a nozzle to dispense liquid crystal from the discharge pump onto a substrate having at least one panel region to be a liquid crystal display panel provided with a second code having information of the substrate an area of the panel region and a cell gap of the liquid crystal display panel,
wherein the liquid crystal capacity amount controlling member controls an amount of liquid crystal to be discharged in accordance with the information of the liquid crystal and the substrate in first and second codes; and
joining the first substrate with a second substrate.

7. A method of manufacturing a liquid crystal display device, the method comprising:
providing a first substrate;
dispensing liquid crystal from the liquid crystal dispensing system, the liquid crystal dispensing system including,
a liquid crystal material container to contain liquid crystal;
a discharge pump including a case, a cylinder, a piston inserted into the cylinder and provided with a groove at a lower portion thereof to draw in and discharge liquid crystal by rotating and moving up-down, and a suction opening and a discharge opening to respectively draw in and discharge liquid crystal as the piston moves;
a first motor to drive the discharge pump;
a nozzle installed at a lower portion of the discharge pump to dispensing liquid crystal from the discharge pump onto a substrate; and
a reading unit to read substrate information recorded in a code formed at the substrate, the substrate information including an area of the panel region and a cell gap of the liquid crystal display panel;
a control unit to set a dispensing amount of liquid crystal based on the substrate information read by the reading unit and to control a discharge amount of liquid crystal dispensed onto the substrate, the control unit including a dispensing amount setting unit to set a dispensing amount of liquid crystal to be dropped onto the substrate and a dispensing amount compensating unit to compensate a differential value between a dispensing amount of liquid crystal set by the dispensing amount setting unit and a substantial dispensing amount dispensed onto the substrate; and
joining the first substrate with a second substrate.

8. A method for manufacturing a liquid crystal display (LCD) device, comprising:
providing a first substrate having a code and a second substrate, the code including first information of an area of the panel region, number of the panel region of the substrate, and a cell gap of the panel region;
reading the code;
setting a dispensing condition of liquid crystal based on the first information of the code;
dispensing liquid crystal on the first substrate using a dispenser according to the dispensing condition; and
attaching the first and second substrate to each other.

9. The method according to claim 8, further comprising:
reading a code including a second information on a liquid crystal container having the liquid crystal; and
determining whether dispensing the liquid crystal on the first substrate is suitable by comparing the read first and second information.

10. The method according to claim 9, wherein when determined that said dispensing is not suitable, said dispensing the liquid crystal on the first substrate using the dispenser is not performed.

11. The method according to claim 9, wherein the dispenser includes a discharge pump to draw in and discharge the liquid crystal from the liquid crystal container.

12. The method of claim 11, wherein the dispensing liquid crystal on the first substrate using a dispenser includes:
positioning the first substrate to a dispensing position; and
dispensing the liquid crystal onto the first substrate by operating the discharge pump.

* * * * *